(12) United States Patent
Hicks et al.

(10) Patent No.: US 6,330,714 B1
(45) Date of Patent: Dec. 11, 2001

(54) METHOD AND COMPUTER PROGRAM PRODUCT FOR IMPLEMENTING REDUNDANT LOCK AVOIDANCE

(75) Inventors: Daniel Rodman Hicks, Byron; John Matthew Santosuosso, Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/246,227

(22) Filed: Feb. 8, 1999

(51) Int. Cl.$^7$ ........................................... G06F 9/45
(52) U.S. Cl. .................. 717/9; 717/4; 717/8; 717/10; 709/104; 709/107; 709/313; 709/316; 710/200; 711/118; 711/168; 707/8
(58) Field of Search .................. 717/4, 5, 8, 10; 710/200; 707/8, 103 Y, 103 R; 709/104, 107, 313, 316, 328; 711/168, 118, 154

(56) References Cited

U.S. PATENT DOCUMENTS

| | | | |
|---|---|---|---|
| 5,265,245 | * 11/1993 | Nordstrom et al. | 707/6 |
| 5,473,777 | * 12/1995 | Moeller et al. | 709/302 |
| 5,701,470 | * 12/1997 | Joy et al. | 707/103 |
| 5,761,670 | * 6/1998 | Joy | 707/103 |
| 5,862,376 | * 1/1999 | Steele, Jr. et al. | 709/107 |
| 5,875,461 | * 2/1999 | Lindholm | 711/118 |
| 6,108,754 | * 8/2000 | Lindholm | 711/122 |
| 6,134,627 | * 10/2000 | Bak | 711/6 |

OTHER PUBLICATIONS

Inohara et al., "Page–Based Optimistic Concurrency Control for Memory–Mapped Persistent Object Systems," IEEE vol. III, Proceedings of the Twenty–Eight Hawaii Int'l Conf. on System Sciences, pp. 645–654 vol. 2, Jan. 3–6 1995.*

Allan Vermeulen, "Java Deadlock, The woes of multi-threaded design," Dr. Dobb's Journal, Sep. 1997.*

"Compilers—Principles, Techniques, and Tools", by Alfred V. Aho, Ravi Sethi and Jeffrey D. Ullman, Mar. 1998, secs. 10.4–10.7, pp. 608–633.

* cited by examiner

*Primary Examiner*—Tuan Q. Dam
(74) *Attorney, Agent, or Firm*—Joan Pennington

(57) ABSTRACT

A method and computer program product are provided for implementing redundant lock avoidance in a virtual call sequence in a computer-system. A first copy of each target method with synchronization enabled and a second copy of each the target method without synchronization enabled are provided. For each virtual call to an object in the virtual call sequence, reaching definition analysis for an object pointer to the object is performed. For each reaching definition of the pointer, it is determined whether each reaching definition represents a pointer to an object known to be locked. Responsive to identifying the pointer to the object not known to be locked, the first copy of the synchronized method with synchronization enabled is selected. Responsive to identifying the pointer to the object known to be locked, the second copy of the synchronized method without synchronization enabled is selected.

11 Claims, 9 Drawing Sheets

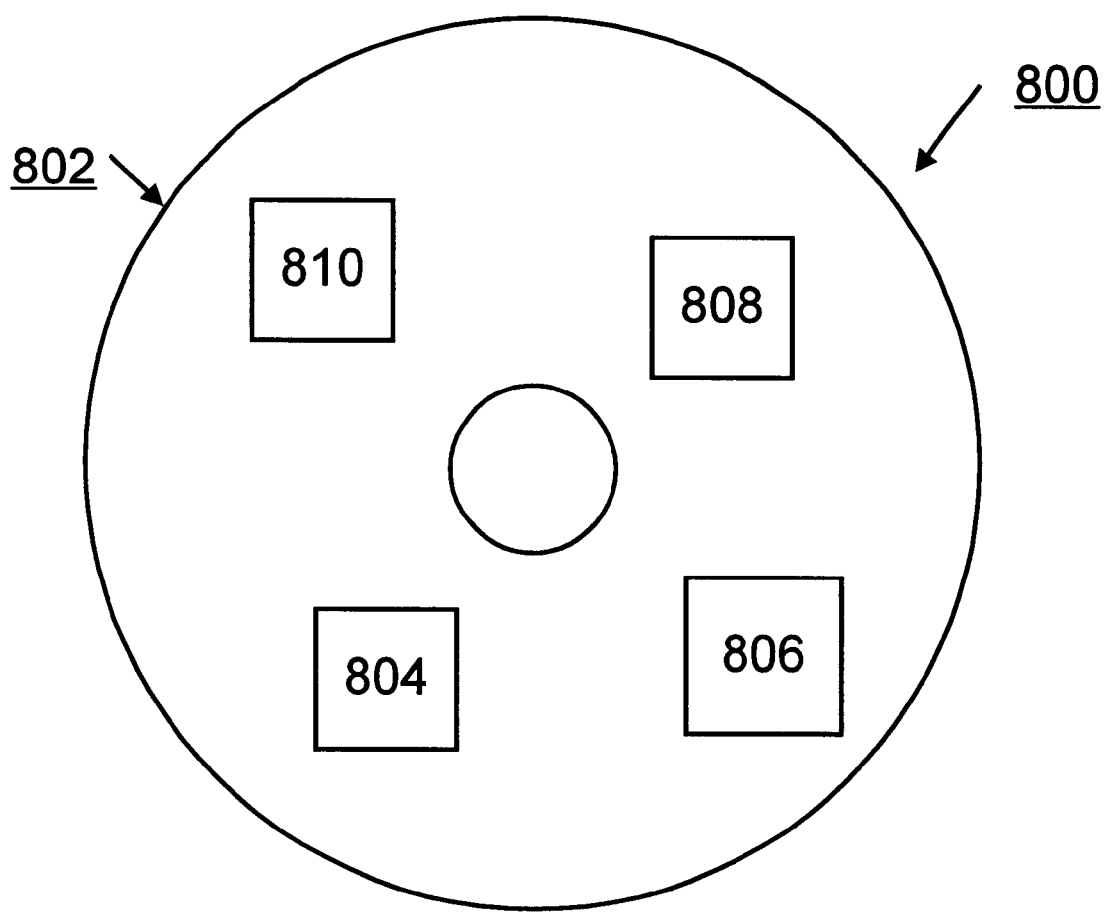

METHOD AND COMPUTER PROGRAM PRODUCT FOR IMPLEMENTING REDUNDANT LOCK AVOIDANCE

FIELD OF THE INVENTION

The present invention relates to the data processing field, and more particularly, relates to a method and computer program product for implementing redundant lock avoidance in a computer system.

DESCRIPTION OF THE RELATED ART

The Java technology has a locking mechanism as part of its language definition. Serialization/locking can be obtained over objects in Java by using the Synchronized keyword.

Since the Java language is also thread capable, the use of the keyword becomes the norm for coding many methods. Overuse of this keyword to provide serialization leads to poor performance for Java applications.

A need exists for an improved method and computer program product for implementing redundant lock avoidance in a computer system.

SUMMARY OF THE INVENTION

A principal object of the present invention is to provide an improved method and computer program product for implementing redundant lock avoidance in a computer system. Other important objects of the present invention are to provide such method and computer program product for implementing redundant lock avoidance substantially without negative effect and that overcome many of the disadvantages of prior art arrangements.

In brief, a method and computer program product are provided for implementing redundant lock avoidance in a virtual call sequence in a computer system. A first copy of each synchronized method with synchronization enabled and a second copy of each the synchronized method without synchronization enabled are provided. For each virtual call to an object in the virtual call sequence, reaching definition analysis for an object pointer to the object is performed. For each reaching definition of the pointer, it is determined whether each reaching definition represents a pointer to an object known to be locked. Responsive to identifying the pointer to the object not known to be locked, the first copy of the synchronized method with synchronization enabled is selected to be executed. Responsive to identifying the pointer to the object known to be locked, the second copy of the synchronized method without synchronization enabled is selected to be executed.

BRIEF DESCRIPTION OF THE DRAWINGS

The present invention together with the above and other objects and advantages may best be understood from the following detailed description of the preferred embodiments of the invention illustrated in the drawings, wherein:

FIG. 8 is a block diagram illustrating a computer program product in accordance with the preferred embodiment.

DETAILED DESCRIPTION OF THE PREFERRED EMBODIMENTS

Figure 1:
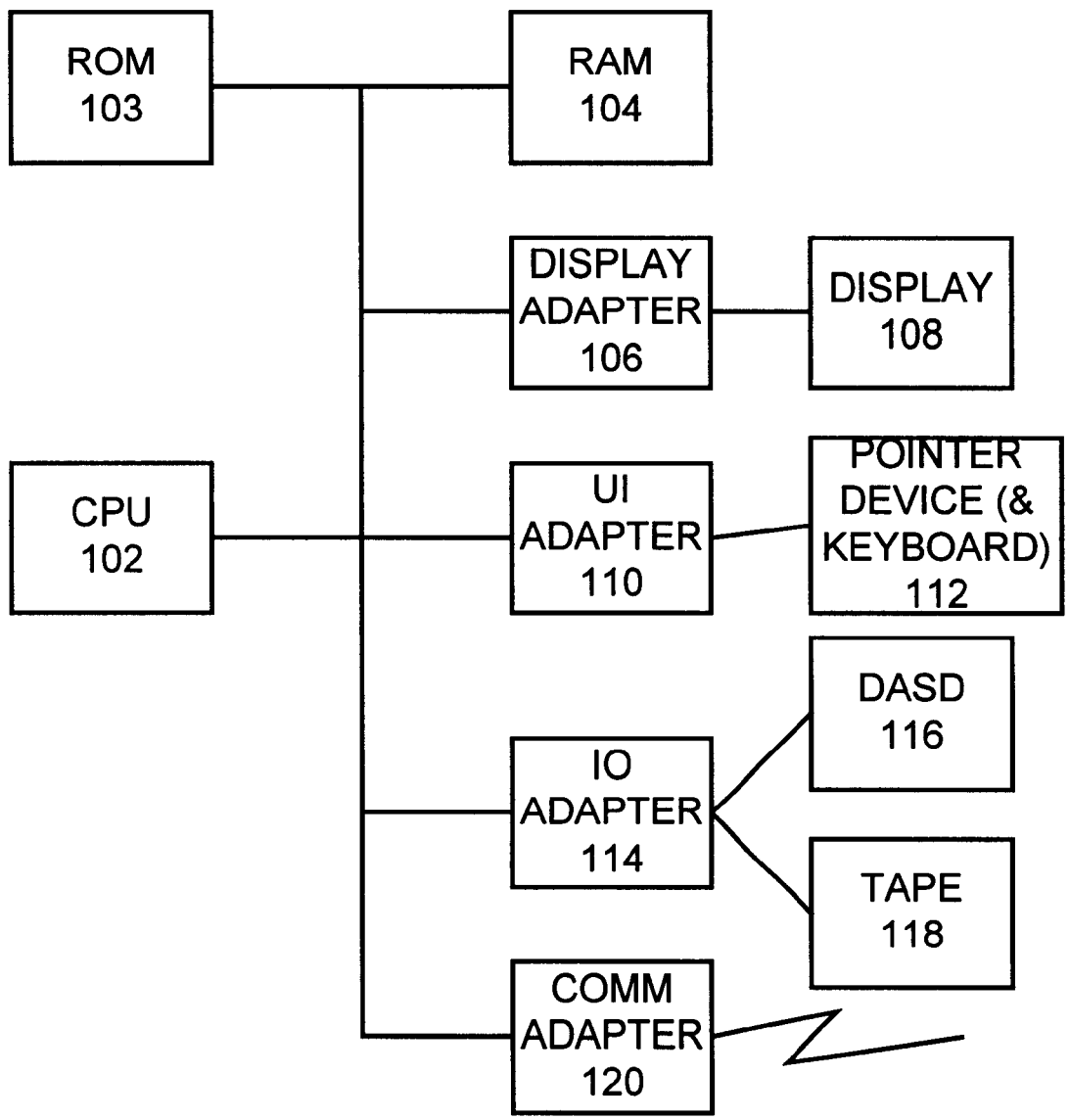
FIG. 1 and 2 are block diagram representations of a computer or data processing system and of an operation system of the preferred embodiment.
Figure 2:
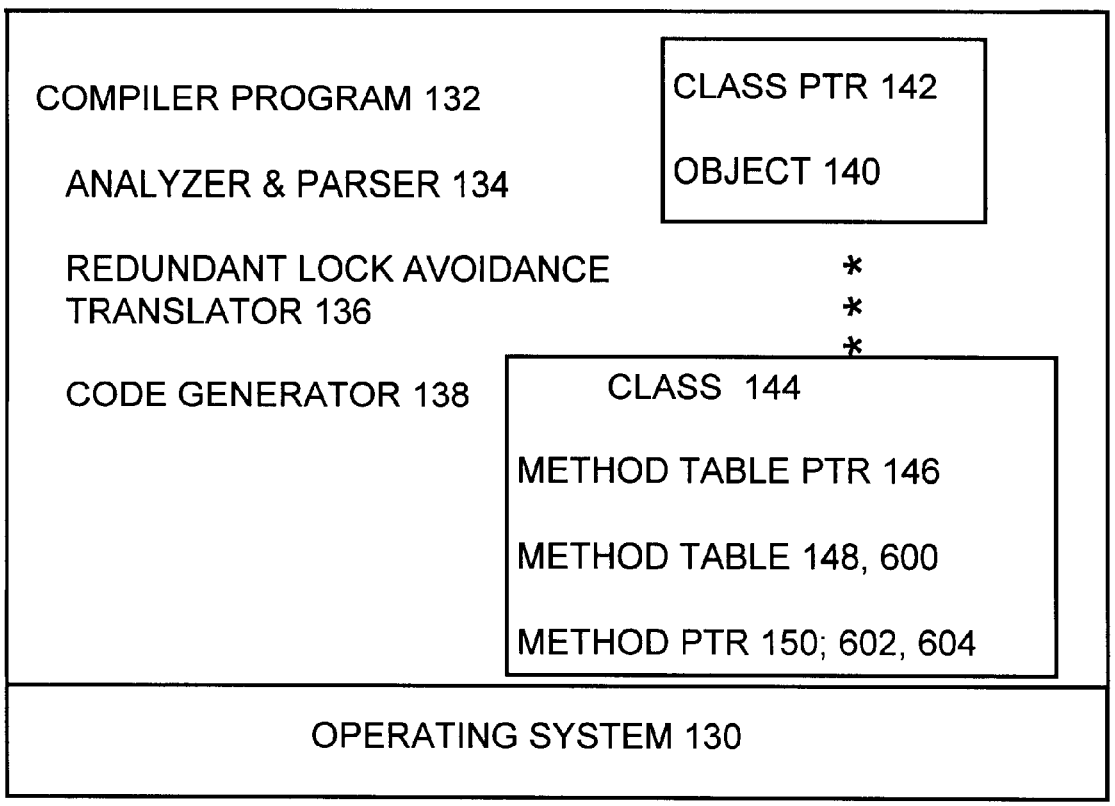

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130, a compiler program 132 of the preferred embodiment. Compiler program 132 includes an analyzer and parser 134, a redundant lock avoidance translator 136 of the preferred embodiment and a code generator 138. Compiler program 132 may reside within computer system 100 or may reside on a separate computer system. Data structures include an object 140, a class pointer (PTR) 142, a class 144, a method table pointer 146, a method table 148, or a method table 600 of the preferred embodiment, and a method PTR 150, or a pair of method pointers 602 and 604 of the preferred embodiment.

In accordance with features of the invention, the redundant lock avoidance translator 136 of the preferred embodiment determines at compilation time when redundant serialization is present. The method and operation of the redundant lock avoidance translator 136 of the preferred embodiment may be understood having reference to the following example of TABLE 1.

In the following example when the ObjectExtender class is instantiated, the constructor calls method1 which in turn calls method2 which in turn calls method3. For each method call, the same object is being locked. Since all these methods are contained within the same class file the redundant lock avoidance translator 136 can determine on method2 and method3 that they need not be called in a synchronized fashion.

TABLE 1

```
public class ObjectExtender extends Object {
    {
    public void ObjectExtender()
    {
    method1 ();
    }
    public synchronized method1 ()
    {
    method2 ();
    }
    public synchronized method2 ()
    {
    method3 ();
```

TABLE 1-continued

```
        }
        public synchronized method3 ()
        {
        }
}
```

Since, methods are often called by more than one other method one simply can not just remove the synchronization keyword unless the method is private and called by an already synchronized method in the class. In accordance with features of the invention, two copies of synchronized methods are provided as illustrated and described with respect to FIGS. 6 and 7. One copy has synchronization enabled and another copy is provided without synchronization. This way the redundant lock avoidance translator 136 can choose either method based upon information it has available to it at compilation time.

Figure 2A:
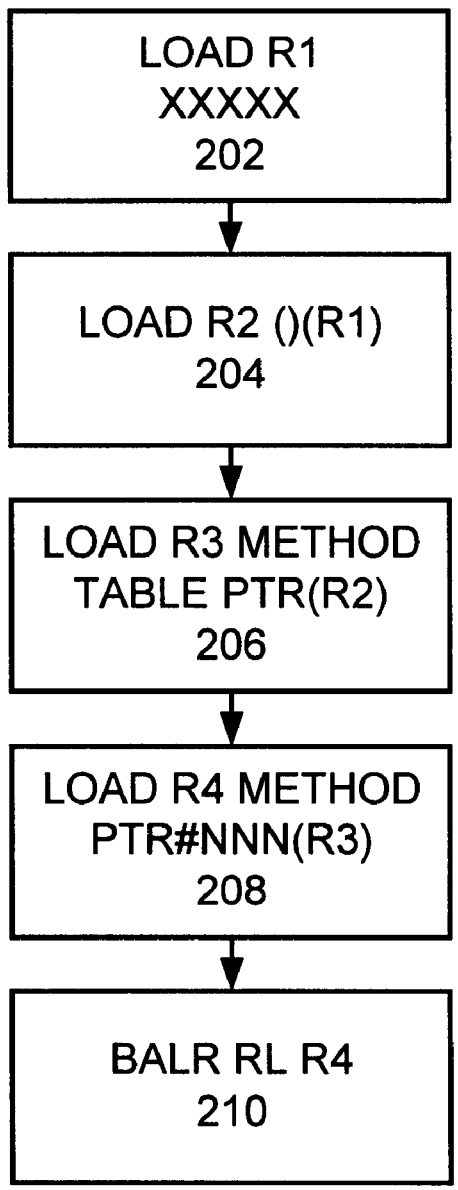
FIG. 2A is a flow chart illustrating a common virtual call sequence in a computer system.

FIG. 2A illustrates a common virtual call sequence. In step (1) the pointer to the object 140 that is the basis of the virtual call is loaded from some program variable as indicated at a block 202. In step (2) the pointer 142 to the internal class representation for the objects' class 144 is loaded, using a pointer cached in the objects' header as indicated at a block 204. In step (3) the pointer 146 to the class's method table 148 is loaded as indicated at a block 206. In step (4) the nnnth method pointer 150 in the class's method tables is loaded as indicated at a block 208. In step (5) the pointer loaded in step (4) is used as the basis for a CALL operation to the target method as indicated at a block 210.

Figure 5:
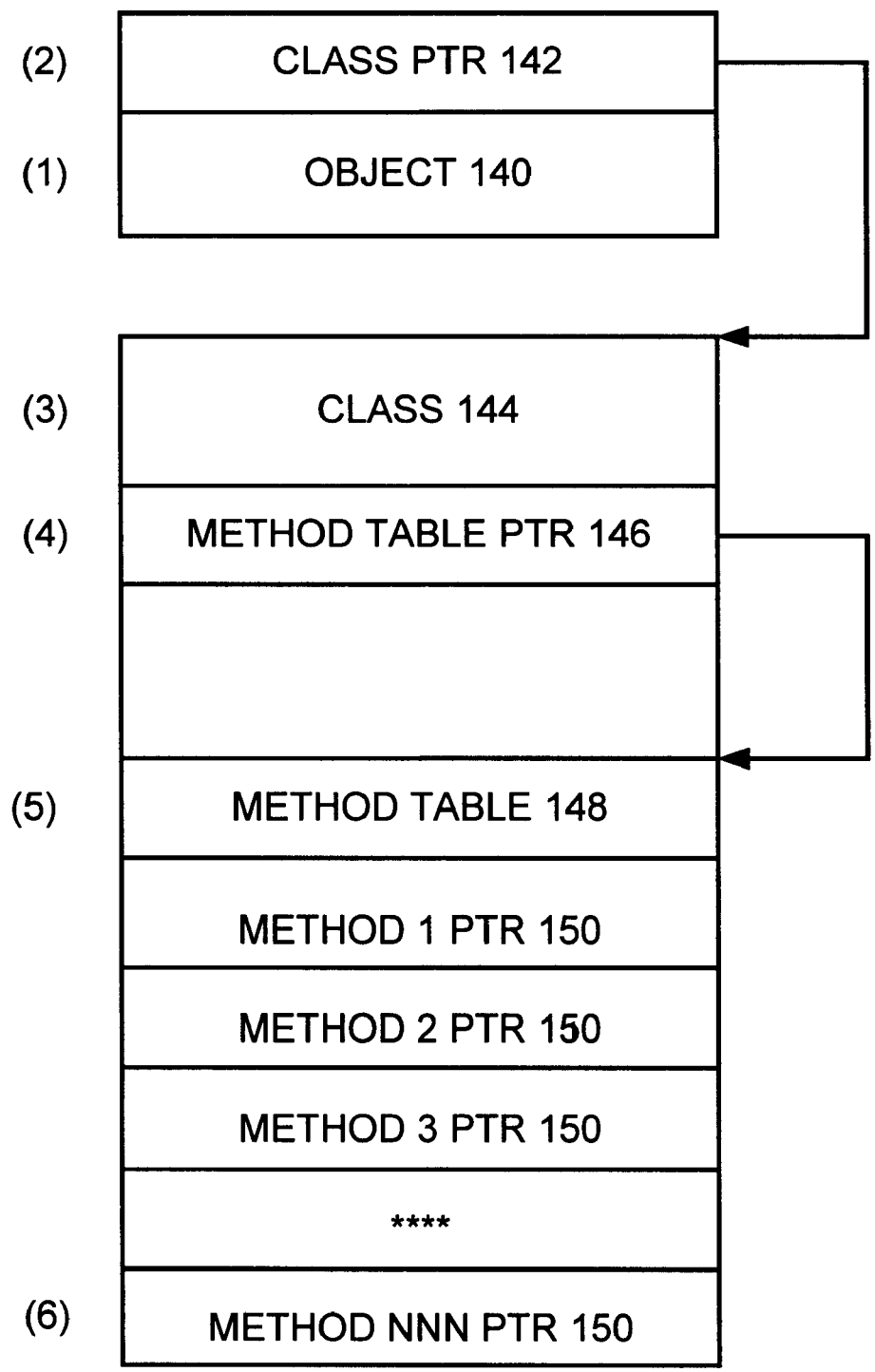
FIG. 5 is a chart illustrating structures used in the sequence of FIG. 2A.

FIG. 5 illustrates the structures used in the FIG. 2A sequence. Object (1) 140 is the object whose address is loaded in step (1) block 202 of FIG. 2A. Object 140 contains a class pointer (2), 142 to the class (3), 144 of the object. Within class 144 is a method table pointer (4), 146 which points to method table (5), 148. Method table 148 may or may not be contiguously allocated with the rest of class 144, though it is conceptually a part of the class 144. The method number of the method to be called, a value which is known to the executing program, either as a compile-time value or as a value fetched from another structure, is used to index into method table 148 to locate the appropriate method table entry (6), 150. The method pointer 150 stored in this method table entry 150 is then used to perform an indirect CALL operation.

This sequence may vary several ways. First, the computer system 100 used to implement it might be different. For example, it might be a stack machine, in which case explicit registers would not be used. Or on a machine roughly conformmant with the hypothetical machine used in FIG. 2A, different registers may be used, or the machine may have instructions with differing mnemonics or capabilities.

More importantly, the internal representation of the object 140 and class 144 may be different. In some Object-Oriented systems the pointer 142 to the internal class is not kept in the object 140, but rather pointers to both object and class are kept in a handle (not shown), and it is the address of the handle, rather than the address of the object, that would be loaded in step (1) at block 202. Also, on some systems, the pointer kept in the object header or handle is a pointer directly to the method table 148, with the internal class address being retrievable from some location within the method table.

A significant difference one might see is that the method number values are not pre-determined but must be fetched from some run-time structure. In such a case the operation of step (4) at block 208 would be an indexed load, using techniques familiar to a practitioner of the art.

Figure 3:
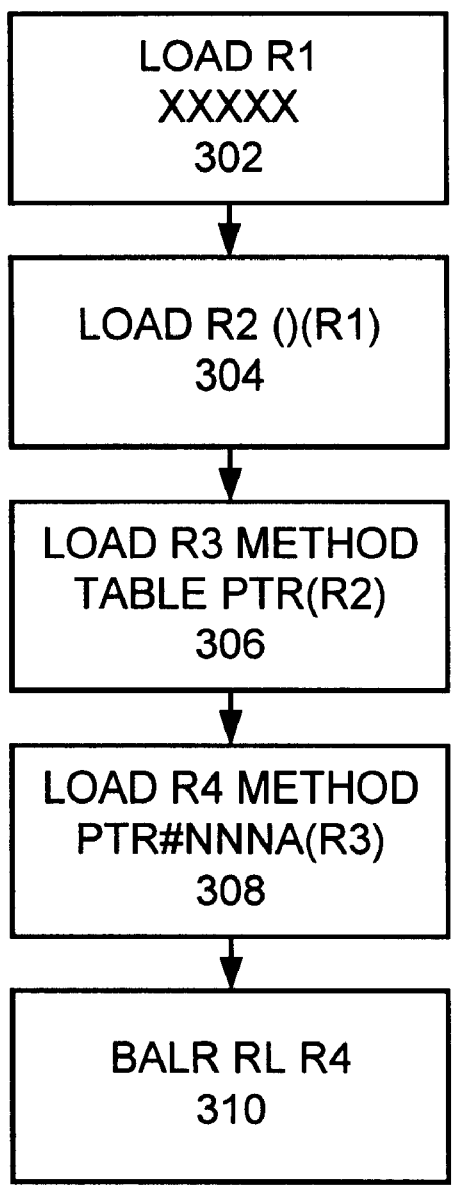
FIGS. 3 and 4 are flow charts illustrating exemplary virtual call sequences of the preferred embodiment.
Figure 4:
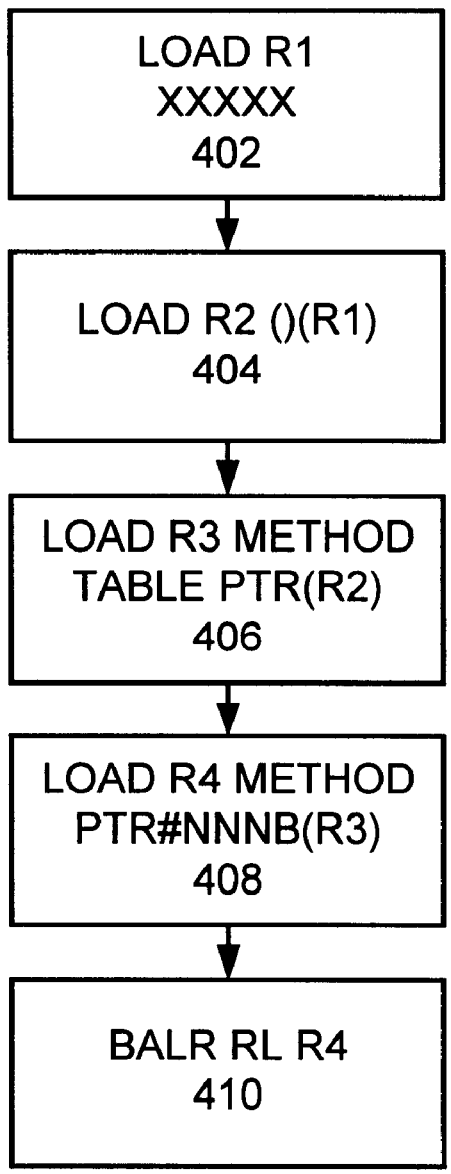

Having reference to FIGS. 3 and 4, one of two alternative sequences of FIG. 3 or FIG. 4 is used depending on the circumstances of the call. In the alternative sequences of FIG. 3 or FIG. 4, except for step (4) at a block 308 of FIG. 3 or step (4) at a block 408 of FIG. 4; identical steps (1)–(3), inclusive and step (5) are performed as illustrated and described with respect to FIG. 2A.

Figure 6:
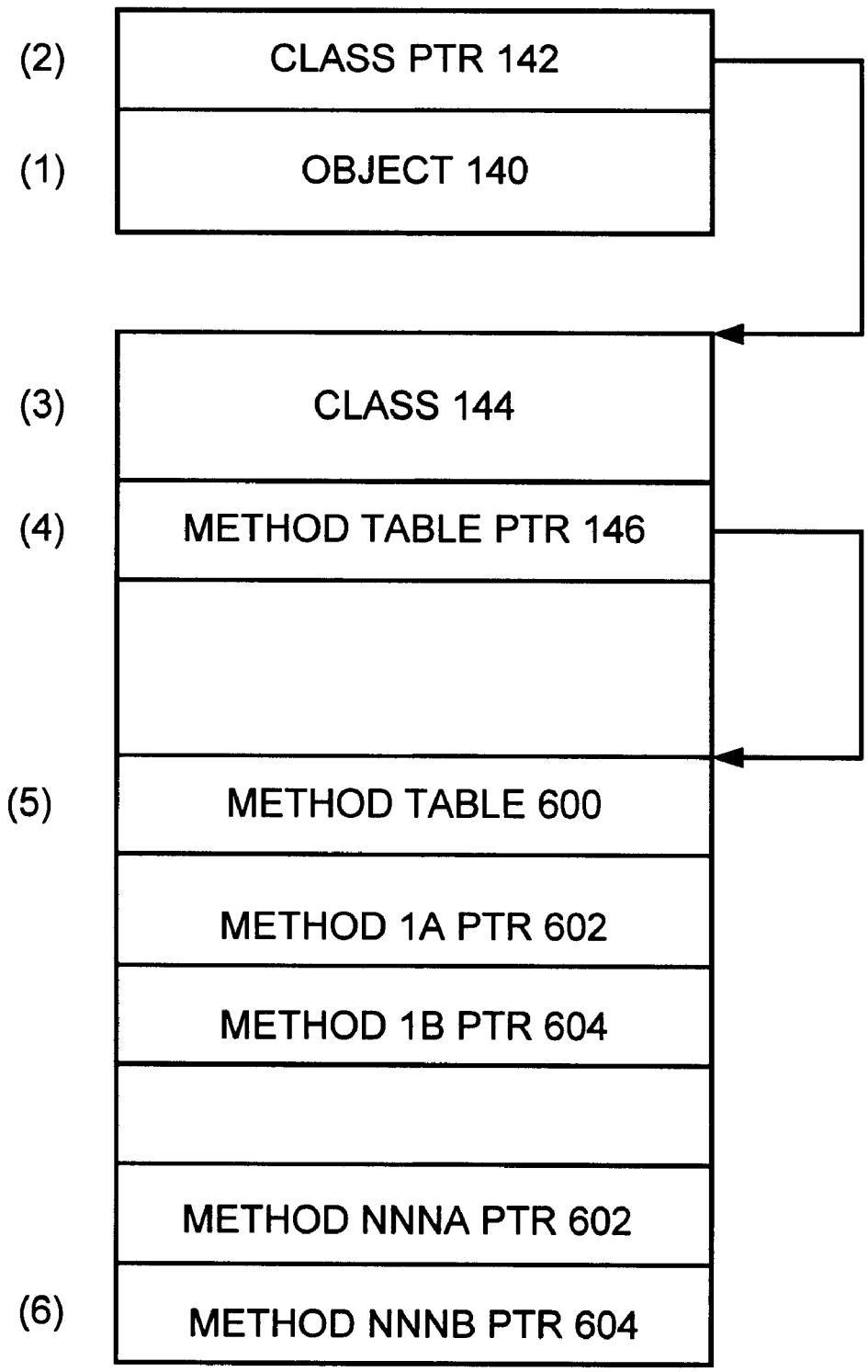
FIG. 6 is a is a chart illustrating structures used in the sequences of FIGS. 3 and 4 of the preferred embodiment.

Referring also to FIG. 6, the structures used by the preferred embodiment are illustrated. The structures (1) through (4), object 140, class pointer 142, class 144, and method table pointer 146 are identical to FIG. 5. Method table 600 is changed in that method table entries contain two pointers A PTR 602 and B PTR 604 are used rather than single pointers 150. The code sequence of FIG. 3 will always select the first of these two pointers, A PTR 602; while the code sequence of FIG. 4 will always select the second of these two pointers, B PTR 604.

An alternative and equivalent way to view method table 600 would be that there are twice as many entries, with the original index being multiplied by 2 and either that entry or the subsequent one being selected depending on whether the A or B version of the target method is desired. It should be understood that, the same effect can be achieved if the positions of the A or B pointers are reversed; there is no significance to one or the other being first so long as a consistent protocol is used.

The code of FIG. 3 is generated when during generation of the executable code, it cannot be determined that the object 140 whose address is loaded in step (1) is already locked to the current thread of execution. However, if it is determined that the object whose address is loaded in step (1) is certainly already locked, then the code of FIG. 4 is generated. The two code sequences of FIGS. 3 and 4 differ only in the pointer, method A PTR 602 at block 308 of FIG. 3 or method B PTR 604 at block 408 of FIG. 4, that is loaded from the method table 600. Which pointer loaded at runtime is determined by an offset that, for most hardware implementations, can be incorporated into the instruction generated for step (4) at block 308 of FIG. 3 or at block 408 of FIG. 4, meaning that no execution-time overhead occurs as a result of having the two pointers 602, 604 as compared to only one pointer 150 of FIGS. 2A and 5.

In the first case in FIG. 3, the pointer loaded, method A PTR 602 at block 308, points to a conventional implementation of the target method, including any locking and unlocking of the object that might be required as a result of, for example, a synchronized method declaration in Java. In the second case in FIG. 4, the pointer loaded method B PTR 604 at block 408, points to an alternative implementation of the target method which does not include the locking and unlocking code, since this code is redundant if the object in question is already locked to the current thread of execution. If the original target method does not require any such locking and unlocking code then only one implementation of the method is required and the two pointers of the method table can be set to address that single implementation, meaning that the only storage overhead of the invention in this case is the additional method table pointer.

The decision as to which of the two alternative sequences, FIG. 3 or FIG. 4 , to generate can be made using techniques know to practitioners skilled in compiler arts. In essence, this decision is made by computing the reaching definitions for the pointer loaded in step (1). If the only reaching definition is the so-called "this" pointer for the current method (i.e., the pointer that was used to virtually call the current method), and if the current method is known to be synchronized, for example, the current method either locked the object addressed by the "this" pointer on entry or it was able to avoid such a locking by virtue of the method of the preferred embodiment, then the object addressed by the pointer loaded in step (1) is known to be locked and the sequence of FIG. 4 advantageously is generated. The net effect of generating the sequence of FIG. 4 is that the expense of a locking/unlock will be avoided in the called method.

There are other cases where it is possible to generate the sequence of FIG. 4. In particular, if something of the nature of a Java synchronized statement has been used to locking an object, it may be possible in some circumstances for a practitioner skilled in compiler arts to compute reaching definitions in such a way as to determine this. In any case where it can be determined that the pointer loaded in step (1) corresponds to a currently locked (to the current thread of execution) object, then the sequence of FIG. 4 can be generated.

For the purposes of the present specification and claims, the term "reaching definitions" is not limited to the precise technique commonly known a reaching definition. There are multiple techniques to analyze program data flow, which do not use the precise technique commonly known a reaching definition, even though they can produce essentially the same information. The term "reaching definitions" should be understood to include such other multiple techniques.

Figure 7:
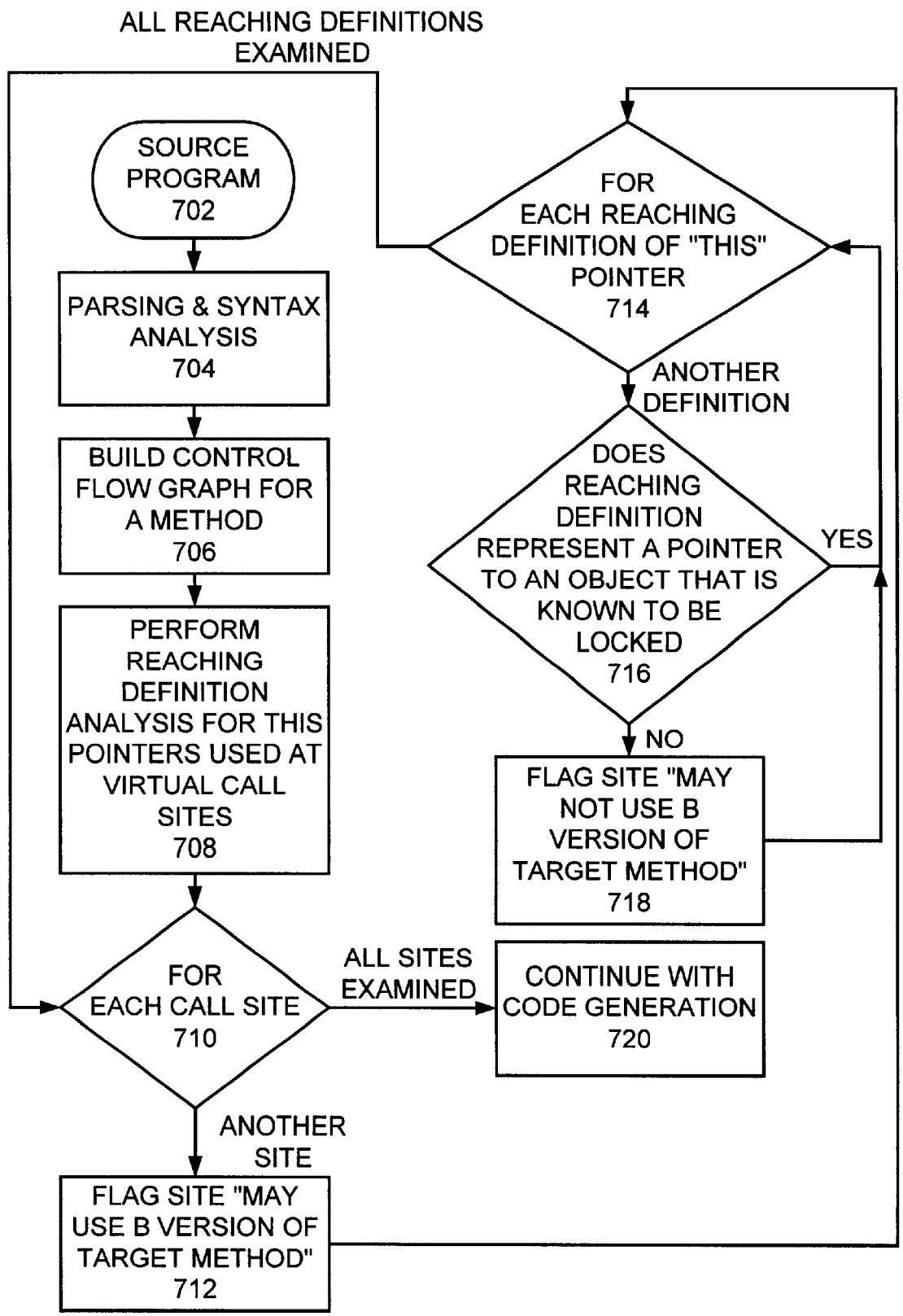
FIG. 7 is a flow chart illustrating exemplary method steps used in compiling a program in accordance with the preferred embodiment.

FIG. 7 illustrates the procedure used in compiling a program to incorporate the method of the preferred embodiment. Block 702 represents the source program input to the process. This may be any form of program representation that can be analyzed via standard compiler techniques. In particular, it may be a source program in human-readable character form, or it may be some sort of intermediate representation, such as a Java class file.

The source program at block 702 is first read by the parser and syntax analyzer 134 at a block 704 which converts the program into an internal representation. During this step certain errors may be checked for and detected in the input, using techniques know to the practitioner of the compiler arts. The output of block 704 is fed to a block 706 where a control flow graph is built for each method (or procedure) in the input program. Again, the techniques for doing this are well known to practitioners. The basic concepts involved are described in "Compilers—Principles, Techniques, and Tools" by Aho, Sethi, and Ullman, a well-known reference and textbook covering compiler techniques.

For each method's control flow graph built at block 706, the remainder of the algorithm of the preferred embodiment is applied. The next step, as indicated at a block 708, involves computing the reaching definitions for each virtual call to an object in the control flow graph produced by block 706. The concept of reaching definitions is described in section 10.5 of the above reference, and some techniques for computing reaching definitions are described in section 10.6.

Block 710 iterates through each virtual call site in the method being considered. Within a representation of the control flow graph, a flag is kept for each such call site, and this flag is initially set to "May use B version of target method" as indicated at a block 712.

Block 714 iterates through each reaching definition that reaches the call site in question and which provides a definition for the "this" pointer used in the call. Each reaching definition found for the "this" pointer of the CALL operation being examined is tested as indicated at a block 716. If the reaching definition so examined represents an object that is know to be locked, for example, because the defining point is the entry point of the method, the definition at that point is coming from the current method's "this" parameter, and the current method is synchronized, then the initial assumption that the "B" version of the target method may be used is maintained. However, if the reaching definition so examined represents an object which is not known to be locked, for example, because it came from a source other than the current method's "this" parameter, or because the current method is not synchronized, or because the reaching definition is ambiguous, as defined in section 10.5 of the above reference, then block 718 must be executed to countermand the initial assumption established in block 712 that the "B" version of the target method can be used. Any single reaching definition that does not satisfy the criteria of block 716 will result in countermanding this initial assumption as indicated at a block 718, regardless of the status of the other reaching definitions.

One special case to consider is when a NULL pointer definition reaches block 716. In such a case it is generally possible to treat this reaching definition as representing a locked object, since there is no object and hence nothing to locking. Treating the NULL pointer reaching definition case as a locked object allows more optimal code to be produced, since if all other reaching definitions represent locked objects, those cases will all benefit from the ability to bypass the expense of locking the object.

Once all call sites in a method have been examined at block 710, control is transferred to a block 720 where the information collected up to this point is used to actually generate machine instructions for the method. Alternatively, it should be understood that it is possible to generate the machine instructions for each call site "on the fly" as it were, once all reaching definitions for that site have been examined, or, since the differences between the code of FIG. 3 and FIG. 4 are minor, it is possible to first generate the code and then perform this analysis, "patching" the code from one form to the other based on what is determined by the analysis described in the resent invention.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for implementing redundant lock avoidance of the preferred embodiment in the system 100 of FIGS. 1 and 2.

A sequence of program instructions or a logical assembly of one or more interrelated modules defined by the recorded program means 804, 806, 808, 810, direct the computer system 100 for implementing redundant lock avoidance of the preferred embodiment.

While the present invention has been described with reference to the details of the embodiments of the invention shown in the drawing, these details are not intended to limit the scope of the invention as claimed in the appended claims.

What is claimed is:

1. A method for implementing redundant lock avoidance in a virtual call sequence in a computer system comprising the steps of:

providing a first copy of each synchronized method with synchronization enabled and a second copy of each said synchronized method without synchronization enabled;

for each virtual call to an object in the virtual call sequence, performing reaching definition analysis for an object pointer to said object;

for each reaching definition of said pointer, checking whether each said reaching definition represents a pointer to an object known to be locked;

responsive to identifying said pointer to said object not known to be locked, selecting said first copy of said synchronized method with synchronization enabled executed.

2. A method for implementing redundant lock avoidance in a virtual call sequence as recited in claim 1 includes the step of responsive to identifying said pointer to said object known to be locked, selecting said second copy of said synchronized method without synchronization enabled to be executed.

3. A method for implementing redundant lock avoidance in a virtual call sequence as recited in claim 1 includes the step of performing parsing and syntax analysis of an inputted source program.

4. A method for implementing redundant lock avoidance in a virtual call sequence as recited in claim 3 includes the step of building a control flow graph for each method of said inputted source program.

5. A method for implementing redundant lock avoidance in a virtual call sequence as recited in claim 4 wherein said step of, for each virtual call to an object in the virtual call sequence, performing reaching definition analysis for said pointer; includes the step of computing reaching definitions for each call site in said control flow graph built for each said method of said inputted source program.

6. A method for implementing redundant lock avoidance in a virtual call sequence as recited in claim 1 wherein said step of providing a first copy of each synchronized method with synchronization enabled and a second copy of each said synchronized method without synchronization enabled includes the step of providing said first copy of each target method with locking and unlocking code.

7. A method for implementing redundant lock avoidance in a virtual call sequence as recited in claim 1 wherein said step of providing a first copy of each synchronized method with synchronization enabled and a second copy of each said synchronized method without synchronization enabled includes the step of providing said second copy of each target method without locking and unlocking code.

8. A computer program product for implementing redundant lock avoidance in a virtual call sequence in a computer, said computer program product including a plurality of computer executable instructions stored on a computer readable medium, wherein said instructions, when executed by said computer, cause the computer to perform the steps of:

providing a first copy of each synchronized method with synchronization enabled and a second copy of each said synchronized method without synchronization enabled;

for each virtual call to an object in the virtual call sequence, performing reaching definition analysis for an object pointer to said object;

for each reaching definition of said pointer, checking whether each said reaching definition represents a pointer to an object known to be locked;

responsive to identifying said pointer to said object not known to be locked, selecting said first copy of said synchronized method with synchronization enabled to be executed.

9. The computer program product for implementing redundant lock avoidance in a virtual call sequence as recited in claim 8 wherein said instructions, when executed by said computer, further cause the computer to perform the step of responsive to identifying said pointer to said object known to be locked, selecting said second copy of said synchronized method without synchronization enabled to be executed.

10. A computer system having apparatus for implementing redundant lock avoidance in a virtual call sequence comprising:

a processor, a memory;

a bus connecting said processor and said memory, means for generating a first copy and a second copy of each of a plurality of synchronized methods, said first copy having synchronization enabled and said second copy having synchronization non-enabled;

means for determining, with respect to each of a plurality of object pointers, each said object pointer pointing to a respective object in a virtual call sequence, whether the respective object is known to be locked; and means, responsive to said means for determining whether the respective object is known to be locked, for selecting said first copy of said synchronized method having synchronization enabled to be executed when said determining means determines that the respective object is not known to be locked.

11. A computer system having apparatus for implementing redundant lock avoidance in a virtual call sequence as recited in claim 10, further including means, responsive to determining that said pointer points to an object known to be locked, for selecting said second copy of said synchronized method having synchronization non-enabled to be executed.

* * * * *

UNITED STATES PATENT AND TRADEMARK OFFICE
CERTIFICATE OF CORRECTION

PATENT NO.   : 6,330,714 B1
DATED        : December 11, 2001
INVENTOR(S)  : Daniel Rodman Hicks, John Matthew Santosuosso Page 1 of 1

It is certified that error appears in the above-identified patent and that said Letters Patent is hereby corrected as shown below:

<u>Column 7, claim 1,</u>
Line 13, add "to be" before "executed".

Signed and Sealed this

Nineteenth Day of March, 2002

Attest:

JAMES E. ROGAN
Director of the United States Patent and Trademark Office

Attesting Officer